Patented Nov. 29, 1938

2,138,516

UNITED STATES PATENT OFFICE 2,138,516

INSECTICIDAL COMPOSITION

Robert L. Sibley, Nitro, W. Va., assignor to Monsanto Chemical Company, St. Louis, Mo., a corporation of Delaware No Drawing. Application October 16, 1936, Serial No. 106,013

10 Claims. (Cl. 167—24)

This invention relates to improvements in insecticidal compositions and it has particular application to compositions of the rotenone and pyrethrum type which may be conveniently employed as insecticidal spray compositions.

One object of this invention is to provide an insecticide, the active principle of which is of the rotenone and pyrethrum class, possessing improved characteristics.

A further object of this invention is to stabilize insecticides containing an active principle of the rotenone and pyrethrum class.

One of the serious disadvantages of the use of insecticides of this class arises from the tendency of the active principle to decompose under the influences of light and heat with an accompanying loss in toxic properties. Thus, for example, pyrethrum and rotenone, when employed as solutions or suspensions thereof and sprayed and exposed to light, are effective for only a few hours and at the most for only a day or two after they have been sprayed on foliage.

In accordance with the present invention, it has been discovered that, on the addition of relatively small amounts of the preferred class of materials, hereinafter described, the stability of insecticides, comprising as an active principle members of the pyrethrum and rotenone class, is markedly increased against destructive influences, such as for example light and heat.

The class of materials which, according to the present invention, possess this remarkable property of retarding the deterioration of insecticides comprising members of the rotenone and pyrethrum class comprise broadly diaryl arylene diamines and their derivatives.

As specific examples of diaryl arylene diamines which may be used successfully as stabilizers of the toxicity effect of rotenone and pyrethrum insecticides are diphenyl p-phenylene diamine, diphenyl m-phenylene diamine, diphenyl o-phenylene diamine, di alpha and beta naphthyl o-, m- and p-phenylene diamine, ditolyl o-, m- and p-phenylene diamine, di biphenyl o-, m- and p-phenylene diamine, diphenyl, dixylyl and ditolyl benzidine, and di o-, and p-biphenyl benzidine.

As examples of derivatives of diaryl arylene diamines, which are employed according to this invention, aldehydes are reacted therewith and the aldehyde amine product so formed employed as stabilizers of said rotenone and pyrethrum containing insecticides. Thus formaldehyde, acetaldehyde, butyraldehyde and heptaldehyde are reacted with the diaryl arylene diamines defined above and the resultant products employed as stabilizers of insecticidal preparations comprising rotenone and pyrethrum.

As a further and more preferred embodiment of the present invention the diaryl arylene diamines of the present invention and as above disclosed are reacted simultaneously with an aliphatic aldehyde and an alcohol to produce exceptionally efficient stabilizers of insecticides containing as an active principle rotenone and pyrethrum and related compounds. Thus, any one or more of the diaryl arylene diamines defined above are reacted simultaneously with an aliphatic aldehyde, for example, formaldehyde, acetaldehyde, butyraldehyde, heptaldehyde and analogous aliphatic aldehydes and an alcohol, for example, methyl, ethyl, butyl, propyl, amyl and analogous alcohols. Further I am not limited to the use of aliphatic alcohols. Thus, I may employ alcohols such, for example as benzyl alcohol and cyclohexanol.

In the reaction of diaryl arylene diamines with aliphatic aldehydes varying proportions of reactants may be employed. Thus, the diaryl arylene diamines may be reacted with one and two molecular proportions of aliphatic aldehyde, and the products so obtained employed to good advantage according to the present invention.

Furthermore, in the reaction of diaryl arylene diamines with aldehydes and alcohols simultaneously, varying proportions of reactants may be employed. Thus, substantially one molecular proportion of the diaryl arylene diamines of the present invention may be reacted with substantially one or two molecular proportions each of aldehyde and alcohol respectively, and the reaction products employed advantageously as stabilizers of pyrethrum and rotenone containing insecticides.

In the preparation of the reaction products of diaryl arylene diamines with an aliphatic aldehyde and an alcohol, a convenient method comprises heating the reactants to refluxing temperature, preferably in the presence of a condensing agent. Thus, as a convenient method of preparation, 260 parts by weight of diphenyl p-phenylene diamine (substantially one molecular proportion), 200 parts by weight of 40% formaldehyde solution (substantially a 33% excess over two molecular proportions) and 200 parts by weight of n-butyl alcohol (substantially a 35% excess over two molecular proportions) were reacted in the presence of a suitable solvent, as for example benzene, and a suitable condensing agent, as for example sodium carbonate, by refluxing aid reactants. After refluxing for substantially 2 to 4 hours, the oily top layer was separated off, washed with water, and the benzene distilled therefrom, whereupon a high yield of a brown viscous oil was obtained. If convenient or desirable the aldehyde amine product may be first produced by reacting the aldehyde with a suitable diaryl arylene diamine, as defined above, and the product so formed reacted with an alcohol.

As illustrative of the value of the preferred class of materials, although in no sense limitative of the scope of the broad invention disclosed above, to pyrethrum powder, such as is commonly employed in dusting flowers, was added two percent by weight of one of the preservative substances as defined above, for example, the reaction product of substantially one molecular proportion of diphenyl p-phenylene diamine with substantially two molecular proportions each of formaldehyde and n-butyl alcohol. Five grams of the insecticidal product so produced was spread thinly on the surface of a container seven inches in diameter and exposed to sunlight. An identical quantity of pyrethrum containing no preservative was exposed to sunlight in like manner. At the end of three days the same number of roaches were allowed to contact with the two insecticides. The time required for an 80% paralyzation from the pyrethrum insecticide containing the preferred preserver was only five minutes, whereas, in the case of the pyrethrum insecticide containing no preservative, the time required for an 80% paralyzation was found to be twelve minutes. Even at the end of nine days, the pyrethrum insecticide containing the preferred preservative required only ten minutes to give an 80% paralyzation of roaches. It is thus readily apparent that the preferred class of compounds possess remarkable properties for stabilizing pyrethrum. In like manner the stabilizing effect of the preferred class of substances, when employed in conjunction with rotenone insecticides, may be demonstrated.

Varying proportions of the preferred class of stabilizers may be employed. Preferably, however, the quantity employed varies from about 0.5% to 10.0% based on the weight of the insecticide.

It has also been demonstrated and is, of course, understood that the preferred class of stabilizers function as preservatives of pyrethrum and rotenone insecticides when employed in conjunction with a liquid vehicle such as naphtha and the like, and in which form these insecticides are frequently marketed.

It is to be understood that where in the claims hereto appended the term "rotenone" appears, it is used in a generic sense and includes rotenone per se, or in association with related compounds having toxicity for insects and which are variously found in nature in association with rotenone, as in cube root, derris resin, etc. It is likewise understood that where in the claims the term "pyrethrum" appears it is used broadly and includes the toxic principles of pyrethrum flowers, whether employed in the form of the ground flowers or as an extract thereof.

What is claimed is:

1. An insecticide having as an active ingredient a material selected from the class consisting in rotenone and pyrethrum compositions and a preservative thereof selected from the class consisting in diaryl arylene diamines, aldehyde derivatives thereof, and the product obtained by reacting a diaryl arylene diamine with an aldehyde and an alcohol.

2. An insecticide having as an active ingredient thereof a material selected from the class consisting in rotenone and pyrethrum compositions and a preservative thereof selected from the class consisting in diaryl phenylene diamines, aldehyde derivatives thereof, and the product obtained by reacting a diaryl phenylene diamine with an aldehyde and an alcohol.

3. An insecticide having as an active ingredient a material selected from the class consisting in rotenone and pyrethrum compositions and a preservative thereof comprising a diaryl arylene diamine reacted with an aliphatic aldehyde.

4. An insecticide having as an active ingredient a material selected from the class consisting in rotenone and pyrethrum compositions and a preservative thereof comprising a diaryl arylene diamine reacted with an aliphatic aldehyde and an alcohol.

5. An insecticide having as an active ingredient a material selected from the class consisting in rotenone and pyrethrum compositions and a preservative thereof comprising a diaryl phenylene diamine reacted with an aliphatic aldehyde.

6. An insecticide having as an active ingredient a material selected from the class consisting in rotenone and pyrethrum compositions and a preservative thereof comprising a diaryl phenylene diamine reacted with an aliphatic aldehyde and an alcohol.

7. An insecticide having as an active ingredient a material selected from the class consisting in rotenone and pyrethrum compositions and a preservative thereof comprising a diaryl phenylene diamine reacted with an aliphatic aldehyde and an aliphatic alcohol.

8. An insecticide having as an active ingredient a material selected from the class consisting in rotenone and pyrethrum compositions and a preservative thereof comprising a diphenyl phenylene diamine reacted with an aliphatic aldehyde and an aliphatic alcohol.

9. An insecticide having as an active ingredient a material selected from the class consisting in rotenone and pyrethrum compositions and a preservative thereof comprising diphenyl p-phenylene diamine reacted with formaldehyde and butyl alcohol.

10. An insecticide having as an active ingredient a material selected from the class consisting in rotenone and pyrethrum compositions and a preservative thereof comprising a reaction product of substantially one molecular proportion of diphenyl p-phenylene diamine and substantially two molecular proportions each of formaldehyde and butyl alcohol.

ROBERT L. SIBLEY.